United States Patent
Wang

(10) Patent No.: US 12,350,590 B2
(45) Date of Patent: Jul. 8, 2025

(54) VIRTUAL OBJECT CONTROL METHOD AND APPARATUS, TERMINAL, STORAGE MEDIUM, AND PROGRAM PRODUCT

(71) Applicant: Tencent Technology (Shenzhen) Company Limited, Shenzhen (CN)

(72) Inventor: Liangfei Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 261 days.

(21) Appl. No.: 17/986,725

(22) Filed: Nov. 14, 2022

(65) Prior Publication Data

US 2023/0071824 A1     Mar. 9, 2023

Related U.S. Application Data

(63) Continuation of application No. PCT/CN2022/072237, filed on Jan. 17, 2022.

(30) Foreign Application Priority Data

Jan. 21, 2021   (CN) .......................... 202110084247.6

(51) Int. Cl.
  *A63F 13/56*   (2014.01)
  *A63F 13/47*   (2014.01)
  *A63F 13/67*   (2014.01)

(52) U.S. Cl.
  CPC .............. *A63F 13/56* (2014.09); *A63F 13/47* (2014.09); *A63F 13/67* (2014.09);
  (Continued)

(58) Field of Classification Search
  CPC ................ A63F 13/537; A63F 13/5372; A63F 13/5375; A63F 13/5378; A63F 13/55;
  (Continued)

(56) References Cited

U.S. PATENT DOCUMENTS

| | | | | |
|---|---|---|---|---|
| 5,405,151 A | * | 4/1995 | Naka ..................... | A63F 13/843 463/31 |
| 5,411,270 A | * | 5/1995 | Naka ..................... | G09G 1/007 463/33 |

(Continued)

FOREIGN PATENT DOCUMENTS

| | | |
|---|---|---|
| CN | 110433488 A | 11/2019 |
| CN | 111265877 A | 6/2020 |

(Continued)

OTHER PUBLICATIONS

CN 111773669 A, machine translation, copyright 2024 Clarivate Analytics, downloaded from PE2E-Search, Sep. 20, 2024.*

(Continued)

*Primary Examiner* — David L Lewis
*Assistant Examiner* — Matthew D Hoel
(74) *Attorney, Agent, or Firm* — Morgan, Lewis & Bockius LLP

(57) ABSTRACT

This application discloses a virtual object control method performed by a terminal, a storage medium, and a program product. The method includes: displaying a game picture of a side-scrolling game, the game picture comprising a first virtual object and one or more movement paths for the first virtual object to move in the side-scrolling game; in response to a use operation on a virtual prop, controlling the first virtual object to use the virtual prop for changing a use state of a movement path for the first virtual object to move in the side-scrolling game; adjusting a use state of a target movement path of the one or more movement paths included in the game picture according to the virtual prop to obtain the adjusted target movement path; and controlling the first virtual object to move on the adjusted target movement path.

11 Claims, 13 Drawing Sheets

(52) U.S. Cl.
CPC .......... *A63F 2300/6027* (2013.01); *A63F 2300/6063* (2013.01); *A63F 2300/632* (2013.01)

(58) Field of Classification Search
CPC .......... A63F 13/56; A63F 13/57; A63F 13/47; A63F 13/67; A63F 13/573; A63F 2300/6027; A63F 2300/6063; A63F 2300/632
See application file for complete search history.

(56) References Cited

U.S. PATENT DOCUMENTS

| | | | | |
|---|---|---|---|---|
| 5,411,272 | A * | 5/1995 | Naka | G09G 1/007 345/658 |
| 5,415,549 | A * | 5/1995 | Logg | A63F 13/5255 434/33 |
| 5,470,080 | A * | 11/1995 | Naka | A63F 13/10 463/33 |
| 5,513,307 | A * | 4/1996 | Naka | G09G 5/42 345/473 |
| 5,963,218 | A * | 10/1999 | Naka | A63F 13/52 345/474 |
| 11,633,671 | B2 * | 4/2023 | Stere | A63F 13/56 463/31 |
| 11,890,541 | B2 * | 2/2024 | Hu | A63F 13/426 |
| 2004/0157662 | A1 * | 8/2004 | Tsuchiya | A63F 13/5378 463/32 |
| 2006/0287027 | A1 * | 12/2006 | Hardisty | A63F 13/45 463/8 |
| 2007/0270215 | A1 * | 11/2007 | Miyamoto | A63F 13/45 463/32 |
| 2008/0214304 | A1 * | 9/2008 | Castle | A63F 13/10 463/36 |
| 2009/0181736 | A1 * | 7/2009 | Haigh-Hutchinson | A63F 13/55 463/2 |
| 2009/0325660 | A1 * | 12/2009 | Langridge | A63F 13/45 463/2 |
| 2012/0306775 | A1 * | 12/2012 | Miyachi | A63F 13/2145 345/173 |
| 2012/0322523 | A1 * | 12/2012 | Woodard | A63F 13/69 463/2 |
| 2013/0196767 | A1 * | 8/2013 | Garvin | A63F 13/422 463/36 |
| 2015/0258439 | A1 * | 9/2015 | Prosin | A63F 13/00 463/31 |
| 2016/0129345 | A1 * | 5/2016 | Seok | A63F 13/213 463/31 |
| 2018/0147488 | A1 * | 5/2018 | Tang | A63F 13/422 |
| 2018/0339229 | A1 * | 11/2018 | He | G06F 3/04847 |

FOREIGN PATENT DOCUMENTS

| | | |
|---|---|---|
| CN | 111481931 A | 8/2020 |
| CN | 111729306 A | 10/2020 |
| CN | 111773669 A | 10/2020 |
| CN | 112717407 A | 4/2021 |
| JP | 2018175418 A | 11/2018 |
| JP | 6588983 B2 | 10/2019 |

OTHER PUBLICATIONS

Bilibili, "The Forgotten Game 5 Crazy Jet", Jul. 24, 2020, 3 pgs., Retrieved from the Internet: https://www.bilibili.com/video/BVIpK4v1x7nR/?spm_id_from=333.337.search-card.all.click&vd_source=76d3264acb028cc08fccd0al45e89a77.

Tencent Technology, ISR, PCT/CN2022/072237, Apr. 15, 2022, 3 pgs.

YouTube.com, "The Nostalgic Turtle Mario is the Best! New Super Mario Bros., Part 7", Shu Games, Jul. 2018, Retrieved from the Internet May 2024: https://www.youtube.com/watch?v=1et9c9lySOo.

YouTube.com, [Warp Zone Location] Capture Super Mario Bros. First Generation Mini Famicom, "All Warp Zones", Aki-Games, Jan. 2017, Retrieved from the Internet May 2024: https://www.youtube.com/watch?v=uS-p23u7etg.

YouTube.com. "Bomb Chicken", Nintendo, Indie World Dec. 27, 2018, Retrieved from the Internet May 2024: https://www.youtube.com/watch?v=cxoaAisyZ7c.

YouTube.com., "[New SuperMarioBros.DS All Boss]", CubeGame, Sep. 2020, Retrieved from the Internet May 2024: https://www.youtube.com/watch?v=rSpzq-v1QmY.

Tencent Technology, WO, PCT/CN2022/072237, Apr. 15, 2022, 4 pgs.

Tencent Technology, IPRP, PCT/CN2022/072237, Jul. 20, 2023, 5 pgs.

YouTube.com, Shiromi Games, "Evolution of P-Switch in Super Mario Games (1988-2019)", Feb. 2019, Retrieved from the Internet: https://www.youtube.com/watch?v=JD8N0eHRmfY.

* cited by examiner

VIRTUAL OBJECT CONTROL METHOD AND APPARATUS, TERMINAL, STORAGE MEDIUM, AND PROGRAM PRODUCT

CROSS-REFERENCE TO RELATED APPLICATIONS

This application is a continuation application of PCT Patent Application No. PCT/CN2022/072237, entitled "VIRTUAL OBJECT CONTROL METHOD AND APPARATUS, AND TERMINAL, STORAGE MEDIUM AND PROGRAM PRODUCT" filed on Jan. 17, 2022, which claims priority to Chinese Patent Application No. 202110084247.6, filed with the State Intellectual Property Office of the People's Republic of China on Jan. 21, 2021, and entitled "VIRTUAL OBJECT CONTROL METHOD AND APPARATUS, TERMINAL, STORAGE MEDIUM, AND PROGRAM PRODUCT", all of which are incorporated herein by reference in their entirety.

FIELD OF THE TECHNOLOGY

This application relates to the field of computer and Internet technologies, and in particular, to a virtual object control method and apparatus, a terminal, a storage medium, and a program product.

BACKGROUND OF THE DISCLOSURE

Currently, the number and types of side-scrolling games are increasing.

In the related art, a movement path of a virtual object is designed in advance in the side-scrolling games. During a game, a user needs to control the virtual object to move on the designed movement path to complete the game.

However, in the foregoing related art, the movement path is designed in advance and the game operation is not flexible.

SUMMARY

Embodiments of this application provide a virtual object control method and apparatus, a terminal, a storage medium, and a program product. The technical solutions are as follows:

According to an aspect of the embodiments of this application, a virtual object control method is performed by a terminal, the method including:

displaying a game picture of a side-scrolling game, the game picture including a first virtual object and at one or more movement paths for the first virtual object to move in the side-scrolling game;

in response to a use operation on a virtual prop, controlling the first virtual object to use the virtual prop for changing a use state of a movement path for the first virtual object to move in the side-scrolling game;

adjusting a use state of a target movement path of the one or more movement paths included in the game picture according to the virtual prop to obtain the adjusted target movement path; and controlling the first virtual object to move on the adjusted target movement path.

According to an aspect of the embodiments of this application, a virtual object control apparatus is provided, including:

a picture display module, configured to display a game picture of a side-scrolling game, the game picture including a first virtual object and one or more movement paths for the first virtual object to move in the side-scrolling game;

a prop use module, configured to control, in response to a use operation on a virtual prop, the first virtual object to use the virtual prop, the virtual prop being used for changing a use state of the movement path for the first virtual object to move in the side-scrolling game;

a path adjustment module, configured to adjust a use state of a target movement path of the one or more movement paths included in the game picture according to the virtual prop to obtain the adjusted target movement path; and an object control module, configured to control the first virtual object to move on the adjusted target movement path.

According to an aspect of the embodiments of this application, a terminal is provided, including a processor and a memory, the memory storing at least one instruction, the at least one instruction being loaded and executed by the processor and causing the terminal to implement the foregoing virtual object control method.

According to an aspect of the embodiments of this application, a non-transitory computer-readable storage medium is provided, storing at least one instruction, the at least one instruction being loaded and executed by a processor of a terminal and causing the terminal to implement the foregoing virtual object control method.

According to an aspect of the embodiments of this application, a computer program product or a computer program is provided, including computer instructions, the computer instructions being stored in a non-transitory computer-readable storage medium. A processor of a terminal reads the computer instructions from the computer-readable storage medium, and executes the computer instructions, to cause the terminal to perform the foregoing virtual object control method.

The technical solutions provided in the embodiments of this application can bring the following beneficial effects:

The state of the target movement path included in the game picture is adjusted through the virtual prop, so that the target movement path is adjustable, which increases diversity of the game and enriches game content. The user can adjust the target movement path according to an actual situation, which makes the game operation more flexible.

In addition, in the embodiments of this application, the virtual object is controlled to use the virtual prop in the side-scrolling game to adjust the use state of the movement path, thereby improving use flexibility of the movement path and the diversity and richness of operation manners of the user. Moreover, in the process of controlling the virtual object, the user can directly adjust the use state of the movement path through the virtual prop. Therefore, time required for the user to control the virtual object to move is saved compared with controlling the virtual object to detour, and movement efficiency of the virtual object is improved, thereby improving efficiency of the user to control the virtual object.

DESCRIPTION OF EMBODIMENTS

To make the objectives, technical solutions, and advantages of this application clearer, the following further describes the implementations of this application in detail with reference to the accompanying drawings.

Figure 1:
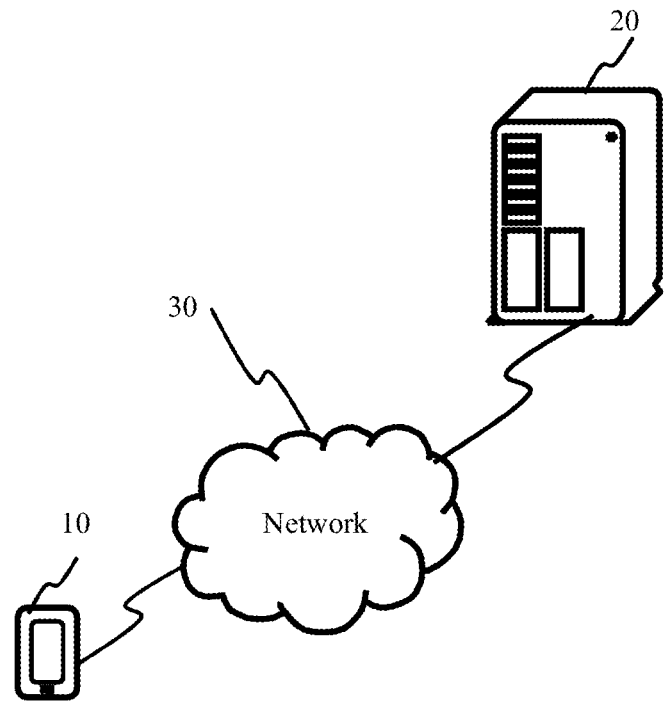
FIG. 1 is a schematic diagram of a side-scrolling game running environment according to an embodiment of this application.

FIG. 1 is a schematic diagram of a side-scrolling game running environment according to an embodiment of this application. The side-scrolling game running environment may include a terminal 10 and a server 20.

The terminal 10 may be an electronic device such as a mobile phone, a tablet computer, a game console, an ebook reader, a multimedia player, a wearable device, or a personal computer (PC). A client of a side-scrolling game may be installed in the terminal 10. The side-scrolling game may be an application that needs to be downloaded and installed, or may be a click-to-run application. This is not limited in the embodiments of this application.

In this embodiment of this application, the side-scrolling game may be any application that can provide a virtual environment for a user to control a virtual object to perform a two-dimensional activity in the virtual environment, such as a horizontal level-breaking game, a side-scrolling fighting game, and a side-scrolling parkour game. The technical solutions provided in the embodiments of this application may be applied to other games than the side-scrolling game, such as a vertical level-breaking game and a vertical racing game. In some embodiments, the side-scrolling game includes at least one movement path for the virtual object to move (such as to walk). The movement path is a two-dimensional movement path. When controlling the virtual object to move, the user may control the virtual object to move up, down, left, and right in a two-dimensional plane, but the user cannot control the virtual object to move forward and backward in a three-dimensional space.

The virtual environment is a scene displayed (or provided) when a client of the side-scrolling game runs on the terminal. The virtual environment refers to a scene created for the virtual object to perform activities such as a virtual house, a virtual island, a virtual map, or a virtual building. The virtual environment may be a simulated environment of a real world, or may be a semi-simulated and semi-fictional environment, or may be a completely fictional environment. The virtual environment may be a two-dimensional virtual environment, a 2.5-dimensional virtual environment, or a three-dimensional virtual environment. This is not limited in the embodiments of this application.

The virtual object may be a virtual character controlled by a user account in the side-scrolling game, or may be a virtual character controlled by a computer program in the side-scrolling game. For example, the virtual object may be a game character controlled by the user account in the side-scrolling game, or may be a game monster controlled by the computer program in the side-scrolling game. The virtual object may be in a human form, an animal form, a cartoon form, or another form. This is not limited in the embodiments of this application. The virtual object may be displayed in a three-dimensional form or a two-dimensional form. This is not limited in the embodiments of this application.

The server 20 is configured to provide a backend service for the client of the side-scrolling game in the terminal 10. For example, the server 20 may be a backend server of the side-scrolling game. The server 20 may be one server, or a server cluster including multiple servers, or a cloud computing service center. In some embodiments, the server 20 provides backend services for multiple clients of the side-scrolling game in the terminal 10.

In some embodiments, the terminal 10 may communicate with the server 20 through a network 30.

Figure 2:
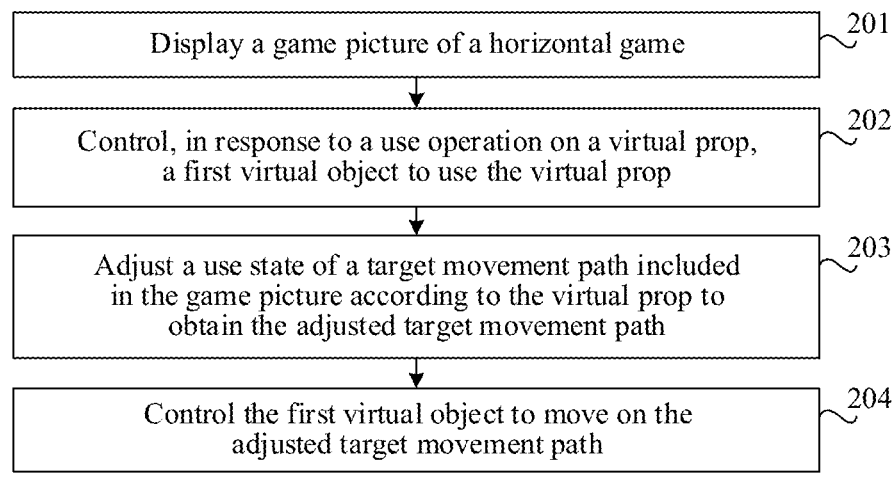
FIG. 2 is a flowchart of a virtual object control method according to an embodiment of this application.

FIG. 2 is a flowchart of a virtual object control method according to an embodiment of this application. The method may be applied to the terminal 10 in the side-scrolling game running environment shown in FIG. 1. For example, an execution body of steps may be a client of a side-scrolling game in the terminal 10. The method may include the following steps (201 to 204):

Step 201. Display a game picture of the side-scrolling game.

In some embodiments, the game picture is a picture of the side-scrolling game, a vertical game or other types of games. This embodiment is described below by using the game being the side-scrolling game as an example.

The side-scrolling game may be any application that can provide a virtual environment for a user to control a first virtual object to perform a two-dimensional activity in the virtual environment, such as a horizontal level-breaking game, a side-scrolling fighting game, and a side-scrolling parkour game. In some embodiments, in the side-scrolling game, when the first virtual object walks, the virtual object may be controlled to move up, down, left, and right in a two-dimensional plane, but the first virtual object cannot move forward and backward in a three-dimensional space.

The game picture refers to a picture that is displayed to the user during a side-scrolling game running process. In some embodiments, the game picture includes the virtual environment that is preset by the side-scrolling game and a real-time operation of the first virtual object. The virtual environment includes a virtual island, a virtual map, a virtual building, a virtual prop and the like. When moving in the virtual environment, the first virtual object may interact with a virtual item in the virtual environment, such as picking up the virtual prop and attacking the virtual building. In some embodiments, the movement of the virtual object includes walking, running, riding, sliding, crawling, flying, jumping, rolling and the like.

In this embodiment of this application, during the side-scrolling game running process, the client displays the game picture of the side-scrolling game. The game picture includes the first virtual object and one or more movement paths for the first virtual object. Each movement path refers to a displacement path of the first virtual object, that is, the movement path is used for indicating a movable route of the first virtual object during the side-scrolling game running process. In some embodiments, the movement path is a path line formed by connecting position points to which the first virtual object can move.

In some embodiments, the movement path is a two-dimensional movement path. In this embodiment of this application, the first virtual object can only move in the two-dimensional plane. In some embodiments, when moving according to the movement path, the first virtual object can move up, down, left, and right in the two-dimensional plane, but cannot move forward and backward in the three-dimensional space. Certainly, in actual application, the movement path may also be called a movement line or other names. This is not limited in the embodiments of this application.

In some embodiments, the first virtual object is a virtual object controlled by the user through a user account, and the user can control the first virtual object to move on the movement path in the virtual environment through the user account; or, the first virtual object is a virtual object controlled by a computer program of the side-scrolling game, and during the side-scrolling game running process, the computer program automatically controls the virtual object to move in the virtual environment according to the movement path. In this embodiment of this application, one user may control multiple different virtual objects, and user accounts corresponding to the different virtual objects may be the same, or may be different. This is not limited in the embodiments of this application.

Certainly, in other possible implementations, the first virtual object includes a virtual object controlled by the user account and a virtual object controlled by the computer program. That is, the side-scrolling game may provide movement paths for different virtual objects. The movement paths corresponding to different virtual objects may be the same, or may be different. This is not limited in the embodiments of this application.

Step 202. Control, in response to a use operation on the virtual prop, the first virtual object to use the virtual prop.

The virtual prop refers to a prop provided by the first virtual object in the side-scrolling game. In a possible implementation, the virtual prop is displayed in the virtual environment, and the first virtual object obtains the virtual prop through a search operation in the virtual environment. Different virtual props may have different positions in the virtual environment. In another possible implementation, the virtual prop is hidden in a game process, and after completing a corresponding operation or performing a corresponding task, the first virtual object obtains the virtual prop. Operations (or tasks) corresponding to different virtual props may be different. Certainly, in actual application, the virtual prop may be a virtual prop that the user or the computer program configures for the first virtual object at the beginning of the side-scrolling game.

In this embodiment of this application, the virtual prop is used for changing a use state of the movement path included in the game picture. After displaying the game picture of the side-scrolling game, the client detects the game picture, and after receiving the use operation on the virtual prop, the client controls the first virtual object to use the virtual prop, and then the client adjusts the use state of the movement path included in the game picture based on an action effect of the virtual prop. The use operation may be an operation generated by trigger of the user, or may be an operation generated by automatic trigger during the side-scrolling game running process.

In a possible implementation, the use operation is an operation generated by triggered of the user. In some embodiments, the user triggers to generate the use operation through a use control of the virtual prop. The game picture includes the use control of the virtual prop, and the client detects the displayed game picture, and after detecting a trigger operation on the use control of the virtual prop, the client determines that the use control of the virtual prop is received and then controls the first virtual object to use the virtual prop. In some embodiments, the manner in which the user triggers to generate the use operation further includes: clicking (such as single-clicking, double-clicking, or triple-clicking) the virtual prop, long pressing the virtual prop, sliding the virtual prop, and dragging the virtual prop to a position on which the virtual prop needs to act.

In some embodiments, the use control of the virtual prop may be directly displayed in the game picture when the side-scrolling game is started, or may be displayed in the game picture after a display condition is met. For example, after displaying the game picture, the client detects the first virtual object and obtains attribute data of the first virtual object, and when the attribute data of the first virtual object meets a condition, the client displays the use control of the virtual prop in the game picture, where the use control is used for triggering the use operation on the virtual prop. The attribute data and the display condition may be flexibly configured according to an actual situation. For example, the attribute data includes a current position of the first virtual object, and when determining that the first virtual object is in a prop use area, the client determines that the attribute data meets the condition and then determines that the display condition of the use control is met currently and displays the use control in the game picture; or, the attribute data includes an operation completed by the first virtual object, and when determining that the first virtual object completes the target operation, the client determines that the attribute data meets the condition and displays the use control in the game picture; or, the attribute data includes a possession duration of the first virtual object for the virtual prop, and when determining that the possession duration exceeds a target value, the client determines that the attribute data is qualified and then determines that the display condition of the use control is met currently, and displays the use control in the game picture. Other examples are not described in this embodiment of this application.

In another possible implementation, the use operation is generated by automatic trigger during the side-scrolling game running process. In some embodiments, after displaying the game picture, the client detects the first virtual object in the game picture to obtain the attribute data of the first virtual object, and when the attribute data meets a prop use condition, the client automatically triggers to generate the use operation on the virtual prop and controls the first virtual object to use the virtual prop. The attribute data and the prop use condition may be flexibly configured according to an actual situation. For example, the attribute data includes a current location of the first virtual object, and the prop use condition is a prop use area in which the first virtual object is located; or, the attribute data includes an operation completed by the first virtual object, and the prop use condition is that the first virtual object completes a target operation; or, the attribute data includes a possession duration of the first virtual object for the virtual prop, and the prop use condition is that the possession duration exceeds a target value. Other examples are not described in this embodiment of this application.

The prop use area may be an area with a special attribute, such as an injury-free area, a damage reduction area, or a speedup area; or, the prop use area may be a preset area, such as an area that centers on a preset coordinate.

In some embodiments, in this embodiment of this application, the first virtual object may possess multiple different virtual props at the same time. In this case, the game picture may display use controls of multiple virtual props, so that the user can flexibly control the first virtual object to use different virtual props. Certainly, the game picture may display a use control of only one virtual prop, and the user replaces the virtual prop for the use control by switching the virtual prop that is currently possessed by the first virtual object.

Step 203. Adjust a use state of a target movement path of the one or more movement paths included in the game picture according to the virtual prop to obtain the adjusted target movement path.

In some embodiments, the use state of the target movement path included in the game picture is adjusted according to the attribute information of the virtual prop to obtain the adjusted target movement path. The attribute information of the virtual prop is used for indicating the action effect of the virtual prop on the movement path. In some embodiments, the use state may also be referred to as a usable state. In some embodiments, the use state refers to whether the virtual object is movable on a corresponding movement path. In some embodiments, the use state includes a usable state and an unusable state. In this embodiment of this application, the virtual prop can control the movement path to switch between the usable state and the unusable state, and action effects corresponding to different virtual props may be different. In some embodiments, when the movement path is in the unusable state, the first virtual object is unmovable on the target movement path; and when the target movement path is in the usable state, the first virtual object is movable on the target movement path.

In this embodiment of this application, after determining that the first virtual object uses the virtual prop, the client obtains the attribute information of the virtual prop and adjusts the use state of the target movement path included in the game picture according to the attribute information of the virtual prop to obtain the adjusted target movement path. The target movement path refers to the movement path on which the virtual prop acts. In some embodiments, the client determines the movement path on which the virtual prop acts based on the action position of the virtual prop to determine the target movement path. Apparently, the movement path on which the virtual prop acts is the target movement path. In some embodiments, the movement path in which the action position of the virtual prop is located is determined as the target movement path. In some embodiments, among movement paths in the usable state, the movement path closest to the action position of the virtual prop is determined as the target movement path.

Step 204. Control the first virtual object to move on the adjusted target movement path.

In this embodiment of this application, after adjusting the target movement path, the client detects the first virtual object in the game picture, and after determining that a movement control operation on the first virtual object is identified, the client controls the first virtual object to move on the adjusted target movement path based on the movement control operation on the first virtual object. The movement control operation may be generated by trigger of the user, or may be generated by automatic trigger during the side-scrolling game running process. This is not limited in the embodiments of this application.

In a possible implementation, the movement control operation is generated by trigger of the user. In some embodiments, the game picture includes a movement control used for controlling the movement of the first virtual object, and the user performs a movement control operation on the first virtual object through the movement control, and then controls the first virtual object to move on the target movement path. Certainly, after the target movement path is adjusted, the user may determine whether to perform the movement control operation on the first virtual object according to an actual situation. This is not limited in the embodiments of this application.

In another possible implementation, the movement control operation is generated by automatic trigger during the side-scrolling game running process. In some embodiments, after determining that the target movement path is adjusted, the client automatically controls the first virtual object to move on the target movement path. For example, assuming that the first virtual object is a virtual object controlled by the computer program, after the target movement path is switched from the unusable state to the usable state, the computer program automatically controls the first virtual object to move on the target movement path.

In conclusion, in the technical solutions provided in the embodiments of this application, the state of the target movement path included in the game picture is adjusted through the virtual prop, so that the target movement path is adjustable, which increases diversity of the game and enriches game content. The user can adjust the target movement path according to an actual situation, which makes the game operation more flexible.

In addition, in the embodiments of this application, the virtual object is controlled to use the virtual prop in the side-scrolling game to adjust the use state of the movement path, thereby improving use flexibility of the movement path and the diversity and richness of operation manners of the user. Moreover, in the process of controlling the virtual object, the user can directly adjust the use state of the movement path through the virtual prop. Therefore, time required for the user to control the virtual object to move is saved compared with controlling the virtual object to detour, and movement efficiency of the virtual object is improved, thereby improving efficiency of the user to control the virtual object.

In some embodiments, in this embodiment of this application, attribute information of the virtual props is different, and corresponding adjustment manners of the use state of the target movement path are different. The state adjustment of the target movement path in this application is described below.

In a possible implementation, the virtual prop has first attribute information. In this case, after determining that the first virtual object uses the virtual prop, the client switches the target movement path from the unusable state to the usable state to obtain the adjusted target movement path. In some embodiments, after the virtual prop is used, the client determines the action position of the virtual prop according to a use situation of the virtual prop to determine the target movement path. Then, after determining that the first virtual object has first attribute information, the client switches the target movement path from the unusable state to the usable state, so that the first virtual object can move on the target movement path.

Figure 3:
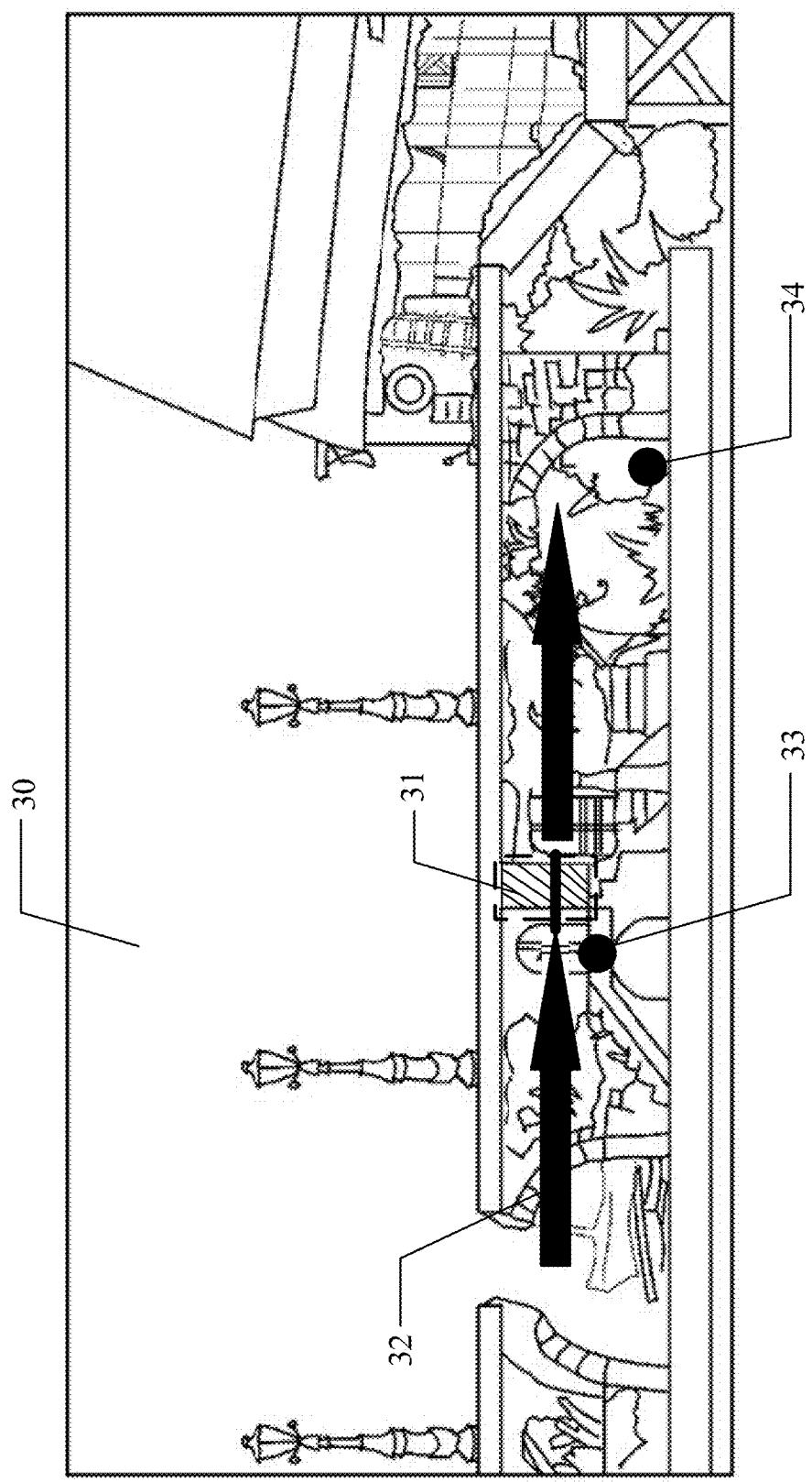
FIG. 3 is an exemplary schematic diagram of a display effect of a game picture.

In some embodiments, if the first attribute information is to eliminate an obstacle (such as breaking an obstacle and removing an obstacle), after detecting the use operation on the virtual prop, the client eliminates the obstacle that is used for disconnecting the target movement path in the target movement path. For example, as shown in FIG. 3, a game picture 30 includes an obstacle 31, and the obstacle 31 causes the target movement path 32 to be in the unusable state. In this case, the first virtual object cannot move from a first position 33 to a second position 34. Further, after the first virtual object uses a virtual prop, since the virtual prop can eliminate the obstacle, the obstacle 31 in the game picture 30 is eliminated, and the target movement path 32 is switched from the unusable state to the usable state.

Figure 4:
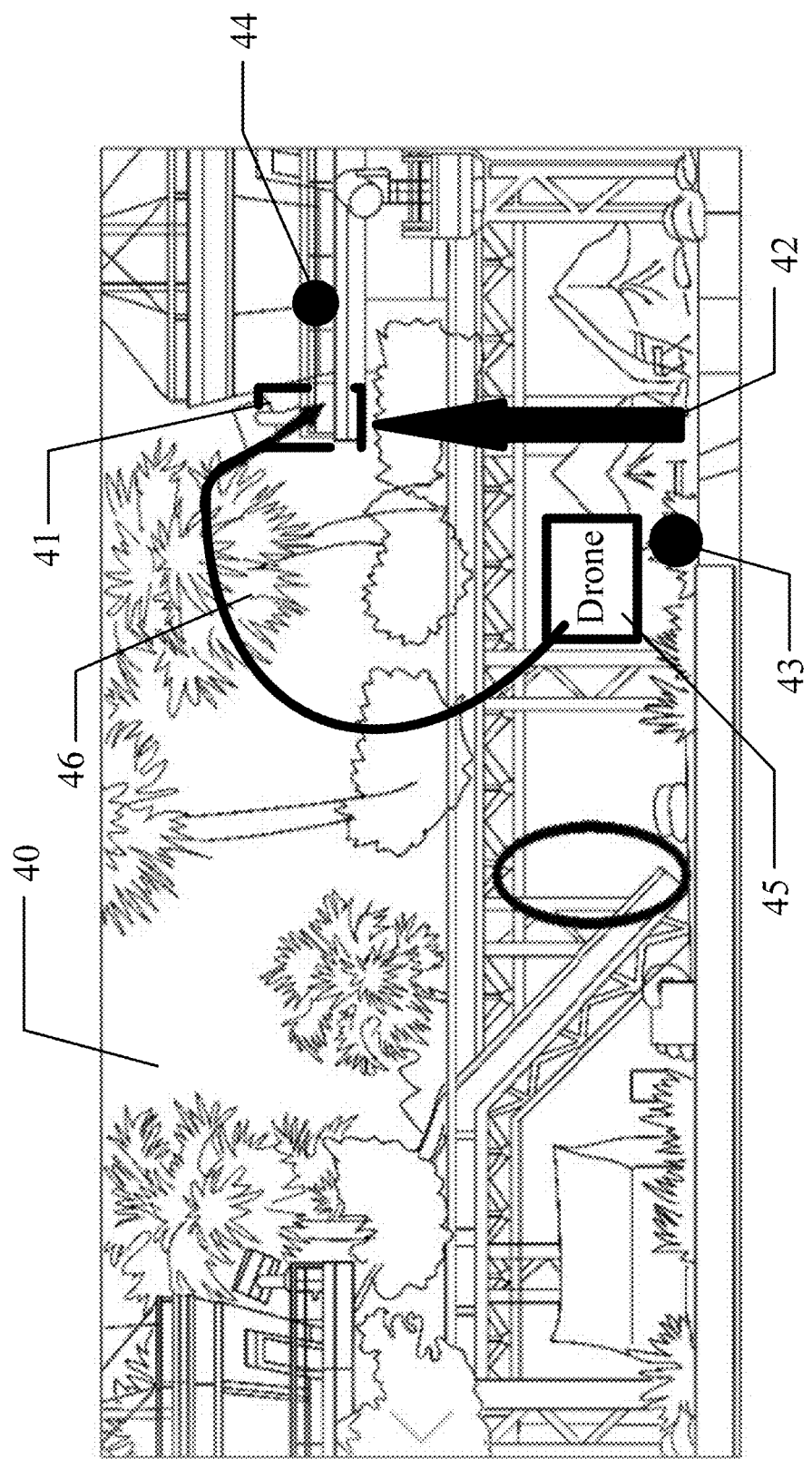
FIG. 4 is an exemplary schematic diagram of a display effect of another game picture.

In some embodiments, if the first attribute information is to add an obstacle (such as using the virtual prop to cross an obstacle, using the virtual prop to fly to a raised platform, or using the virtual prop to pass through a damage reduction area), after detecting the use operation on the virtual prop, the client adds a usable movement path to the target movement path. For example, as shown in FIG. 4, a game picture 40 includes a raised platform 41. In this case, a target movement path 42 is in the unusable state, and the first virtual object cannot move from a first position 43 to a second position 44. Further, after the first virtual object uses a virtual prop 45, since the virtual prop 45 can add a path, the usable movement path 46 added by the virtual prop 45 may be displayed in the game picture 40. In this case, the target movement path 42 is switched from the unusable state to the usable state.

Figure 5:
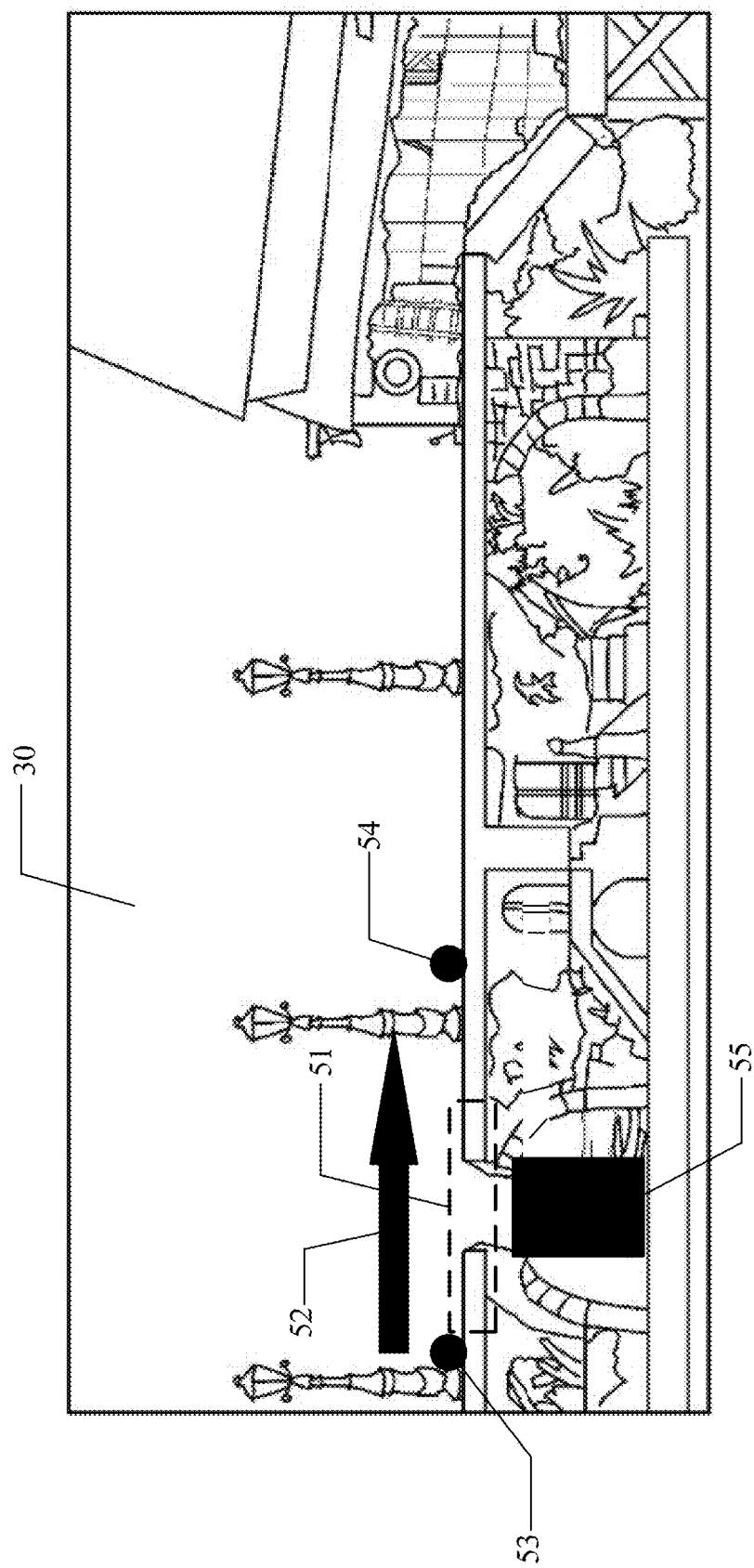
FIG. 5 is an exemplary schematic diagram of a display effect of another game picture.

In some embodiments, if the first attribute information is to replace a path (such as filling up a trap), after detecting the use operation on the virtual prop, the client replaces the unusable movement path with the usable movement path in the target movement path. For example, as shown in FIG. 5, a game picture 30 includes a trap 51. In this case, a target movement path 52 is in the unusable state, and the first virtual object cannot move from a first position 53 to a second position 54. Further, after the first virtual object uses a virtual prop 55, since the virtual prop 55 can replace a path, the virtual prop 55 appears in the game picture 30 to fill up the trap 51, and a usable movement path corresponding to the virtual prop 55 is used to replace an unusable movement path corresponding to the trap 51. In this case, the target movement path 52 is switched from the unusable state to the usable state. The unusable movement path refers to a partial movement path in the target movement path 52.

In the foregoing implementation, the virtual prop is used to switch the target movement path from the unusable state to the usable state, so that the virtual object can move on the target movement path, which enriches adjustment manners of the path and further improves flexibility of the game operation.

In another possible implementation, the virtual prop has second attribute information. In this case, after determining that the first virtual object uses the virtual prop, the client switches the target movement path from the usable state to the unusable state to obtain the adjusted target movement path. In some embodiments, after the virtual prop is used, the client determines the action position of the virtual prop according to a use situation of the virtual prop to determine the target movement path. Then, after determining that the virtual prop has the second attribute information, the client adjusts the use state of the target movement path, and switches the target movement path from the usable state to the unusable state, so that the first virtual object cannot move on the target movement path.

Figure 6:
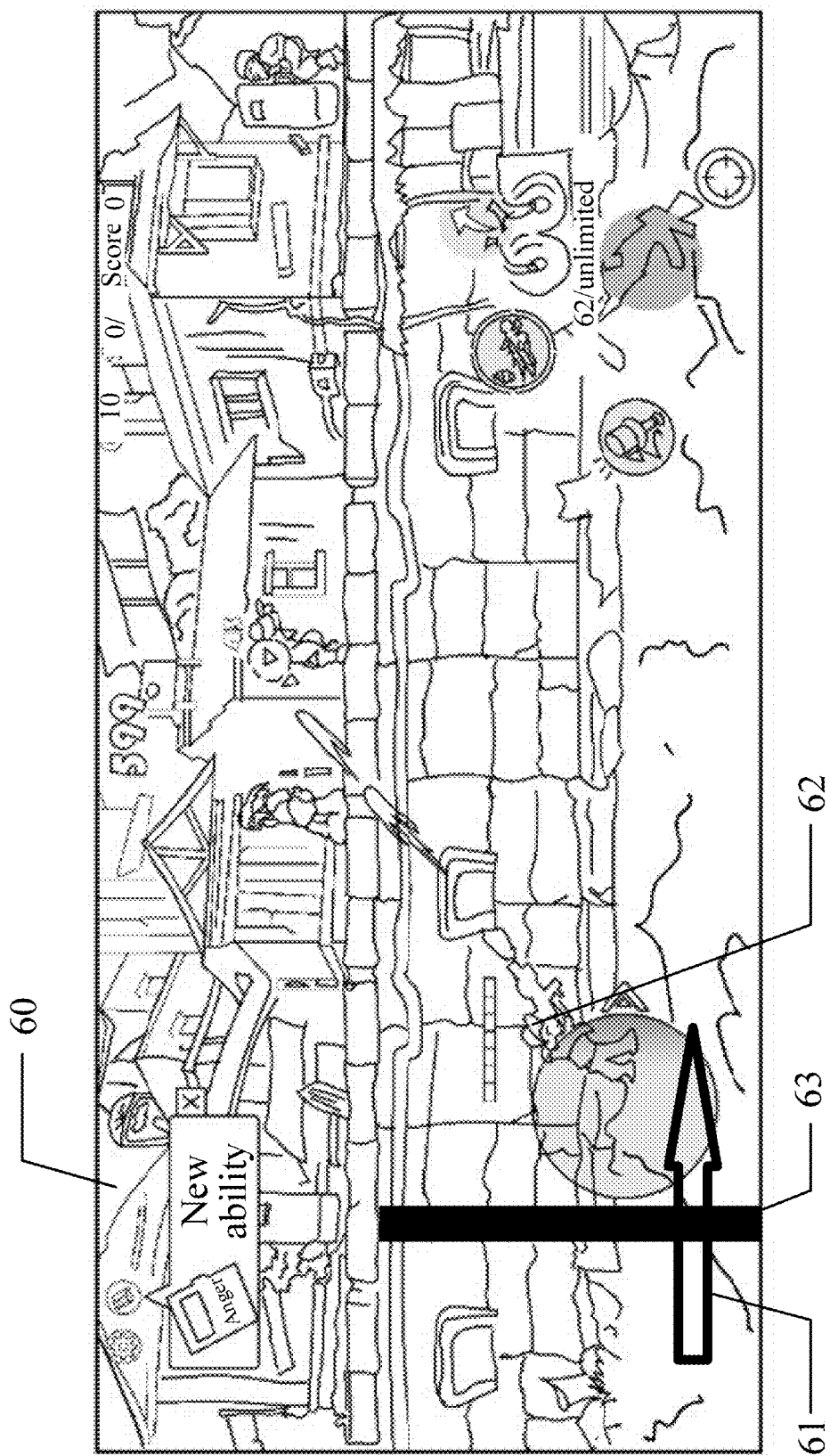
FIG. 6 is an exemplary schematic diagram of a display effect of another game picture.

In some embodiments, if the second attribute information is to add an obstacle, after detecting the use operation on the virtual prop, the client adds the obstacle that is used for disconnecting the target movement path in the target movement path. For example, as shown in FIG. 6, a game picture 60 includes a target movement path 61 that is in the usable state, and after the first virtual object 62 uses the virtual prop, an obstacle 63 that is used for disconnecting the target movement path 61 appears in the game picture 60, and then the target movement path 61 is switched from the usable state to the unusable state. In this case, since the target movement path 61 is in the unusable state, an adversarial virtual object of the first virtual object 61 cannot move on the target movement path 61 and attack the first virtual object 61.

Figure 7:
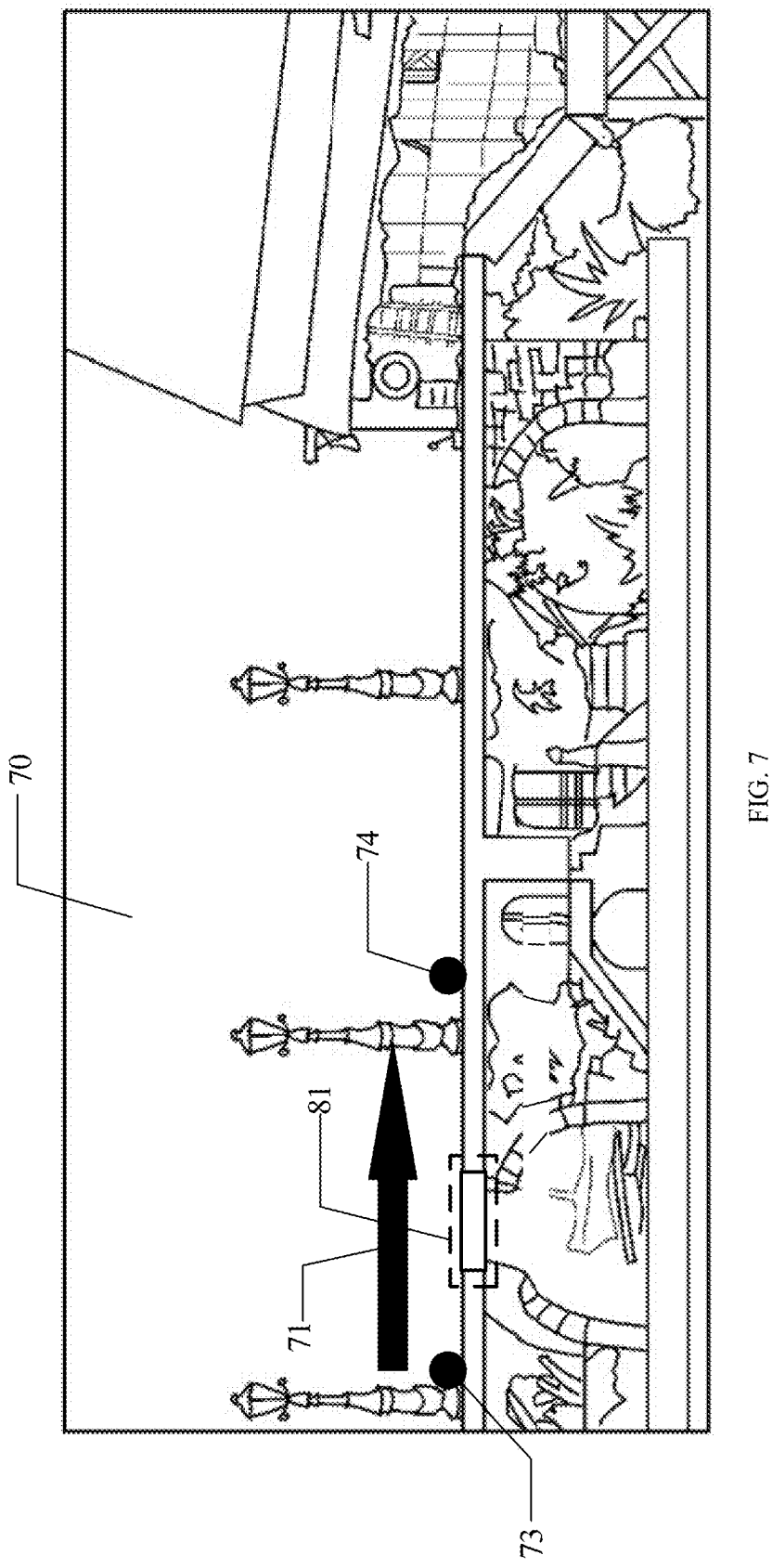
FIG. 7 is an exemplary schematic diagram of a display effect of another game picture.

In some embodiments, if the second attribute information is to replace a path (such as placing a trap on the ground), after detecting the use operation on the virtual prop, the client replaces the usable movement path with the unusable movement path in the target movement path. For example, as shown in FIG. 7, a game picture 70 includes a target movement path 71 that is in the usable state. After the first virtual object uses the virtual prop, a trap 72 appears in the game picture 70, and a usable movement path in the target movement path 71 is replaced with an unusable movement path corresponding to the trap 72. In this case, the target movement path 71 is switched from the usable state to the unusable state, the first virtual object cannot move from a first position 73 to a second position 74, and the adversarial virtual object of the first virtual object also cannot move from the second position 74 to the first position 73. The usable movement path refers to a partial movement path in the target movement path 71.

Figure 8:
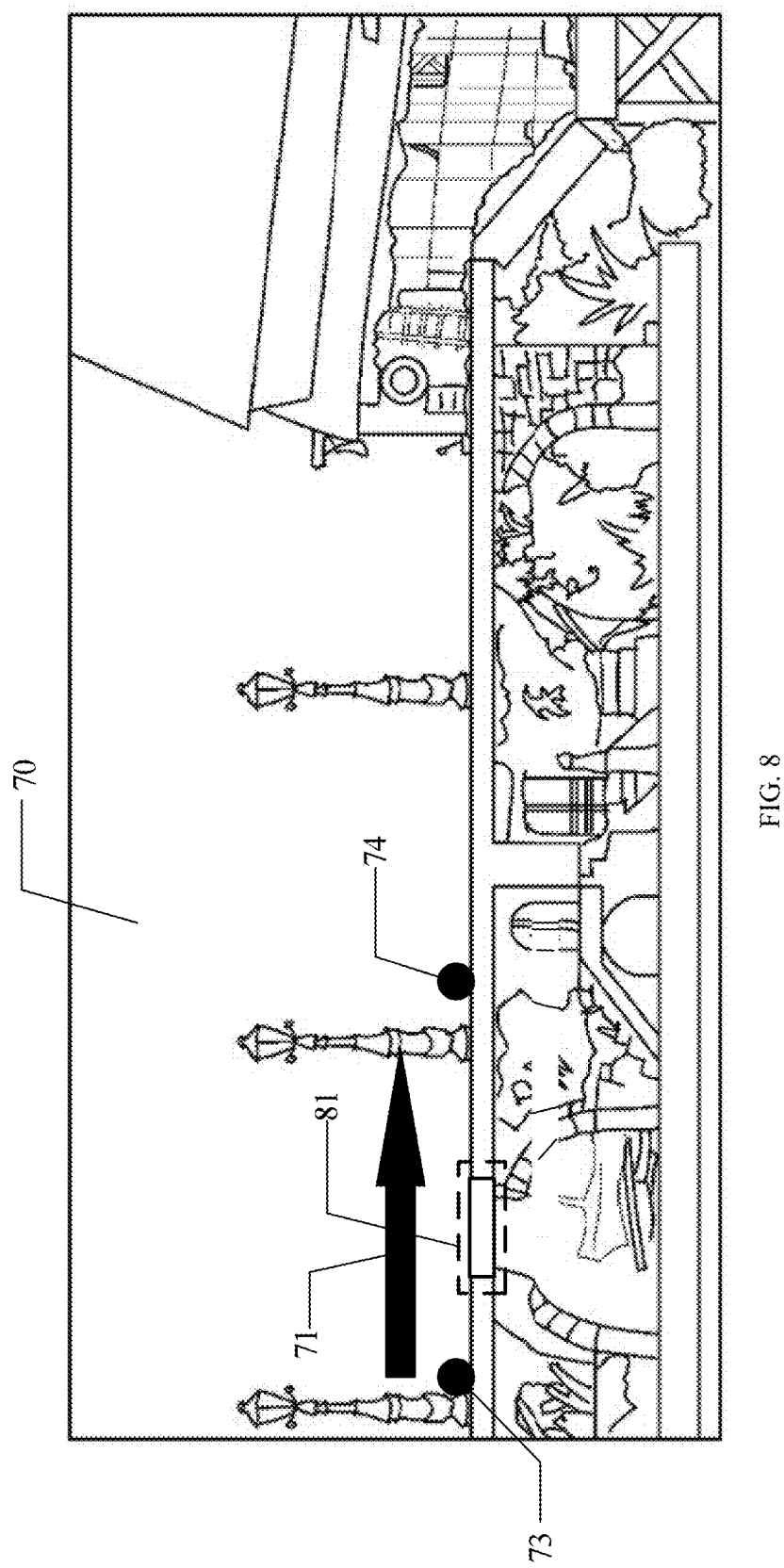
FIG. 8 is an exemplary schematic diagram of a display effect of another game picture.

In some embodiments, if the second attribute information is to eliminate a path (such as smashing the ground), after detecting the use operation on the virtual prop, the client eliminates the usable movement path from the target movement path. For example, as shown in FIG. 8, a game picture 70 includes a target movement path 71 that is in the usable state. After the first virtual object uses the virtual prop, the virtual prop is used to smash part of the ground to eliminate the usable movement path 81 in the target movement path 71. In this case, the target movement path 71 is switched from the usable state to the unusable state, the first virtual object cannot move from a first position 73 to a second position 74, and the adversarial virtual object of the first virtual object also cannot move from the second position 74 to the first position 73. The usable movement path 81 refers to a partial movement path in the target movement path 71.

In the foregoing implementation, the virtual prop is used to switch the target movement path from the usable state to the unusable state, to prevent the adversarial virtual object from moving on the target movement path, which enriches adjustment manners of the path and further improves flexibility of the game operation.

In addition, in this embodiment of this application, after controlling the first virtual object to use the virtual prop, the client updates a virtual environment element corresponding to the target movement path in a virtual environment displayed in the game picture based on the adjusted target movement path, thereby prompting progress and situation of the game, and improving the display richness and display effect of the game picture. In some embodiments, the client displays the virtual prop as the obstacle in the virtual environment displayed in the game picture based on the adjusted target movement path; or, the client cancels display of the obstacle that is used for disconnecting the target movement path in the virtual environment displayed in the game picture based on the adjusted target movement path;

or, the client displays an action effect of the virtual prop on the target movement path in the virtual environment displayed in the game picture based on the adjusted target movement path. In addition, a change of the game picture is shown in the foregoing FIG. 3 to FIG. 8, and details are not described herein again.

In some embodiments, in this embodiment of this application, one virtual prop may correspond to multiple different path change solutions. In an exemplary embodiment, after the foregoing step 202, the method may further include the following steps:

1. Generate multiple candidate path change solutions based on attribute information of the virtual prop, where different path change solutions correspond to different path adjustment manners.

2. Display the multiple candidate path change solutions.

3. Adjust, in response to a selection operation on a target path change solution of the multiple candidate path change solutions, the use state of the target movement path included in the game picture based on the target path change solution to obtain the adjusted target movement path.

In this embodiment of this application, after detecting the use operation on the virtual prop, the client obtains the attribute information of the virtual prop, generates multiple candidate path change solutions based on the attribute information, and displays the multiple candidate path change solutions.

In a possible implementation, the multiple candidate path change solutions are directly displayed in the game picture. In some embodiments, after obtaining the multiple candidate path change solutions, the client displays the action position of the virtual prop in the game picture based on the multiple candidate path change solutions. The different path change solutions correspond to different display styles of the action position of the virtual prop, and the different path change solutions may correspond to different action times of the virtual prop. In some embodiments, after detecting the use operation on the use control of the virtual prop, the client may determine to use the virtual prop.

Figure 9:
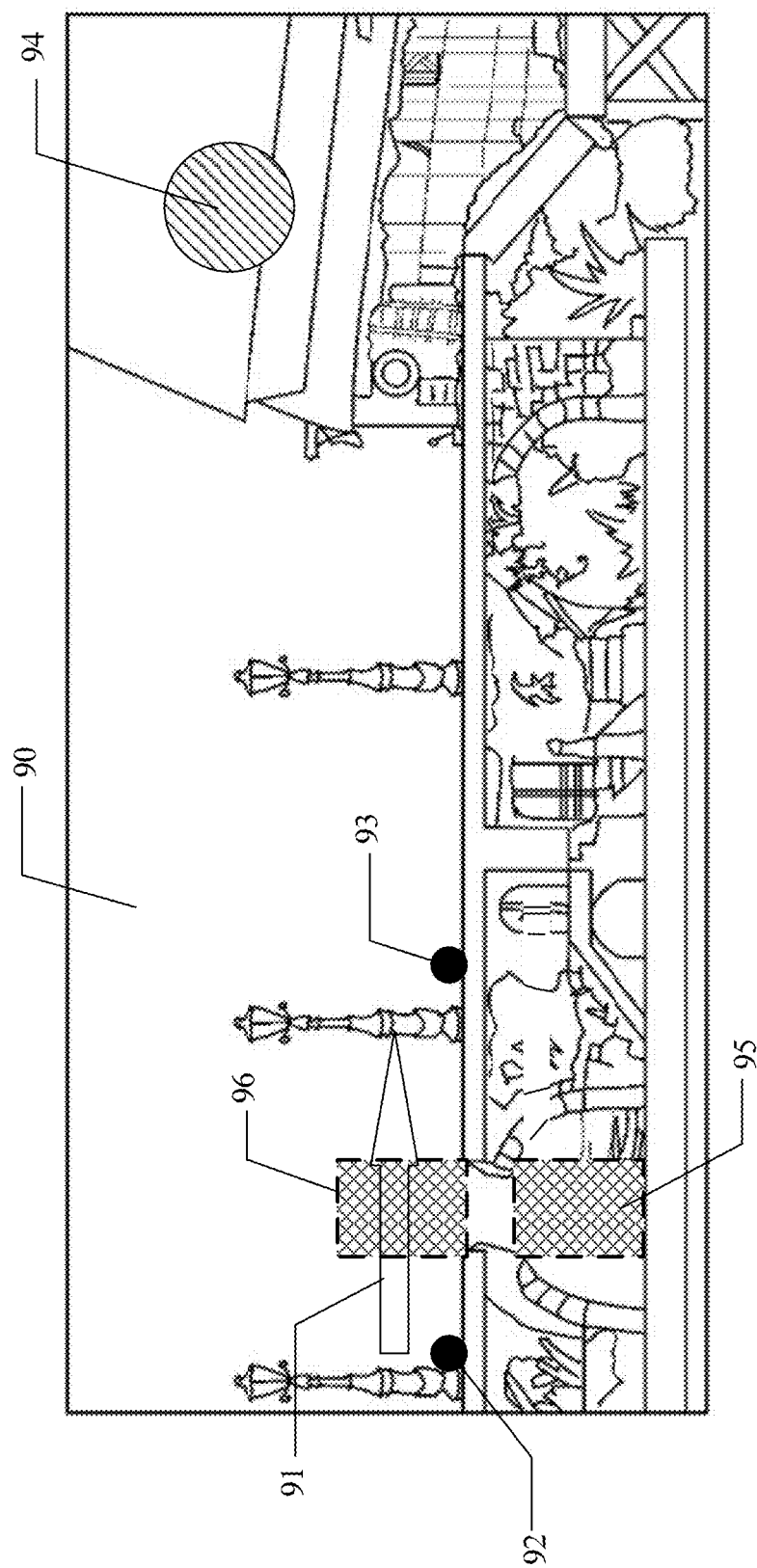
FIG. 9 is an exemplary schematic diagram of a display effect of another game picture.

In some embodiments, if the use control of the virtual prop is used for instructing the first virtual object to use the virtual prop, the multiple candidate path change solutions are path change solutions to the same virtual prop. For example, referring to FIG. 9, a game picture 90 includes a target movement path 91 that is in the unusable state, and the first virtual object is in a first position 92 and cannot move to a second position 93. In this case, after detecting a trigger operation on a use control 94 of a virtual prop, the client controls the first virtual object to use the virtual prop (block), and displays a first action position 95 of the virtual prop (fills to below a ground break) and a second action position 96 (fills to above the ground break) in the game picture 90. The first action position 95 corresponds to a first candidate path change solution, and the second action position 96 corresponds to a second candidate path change solution.

Figure 10:
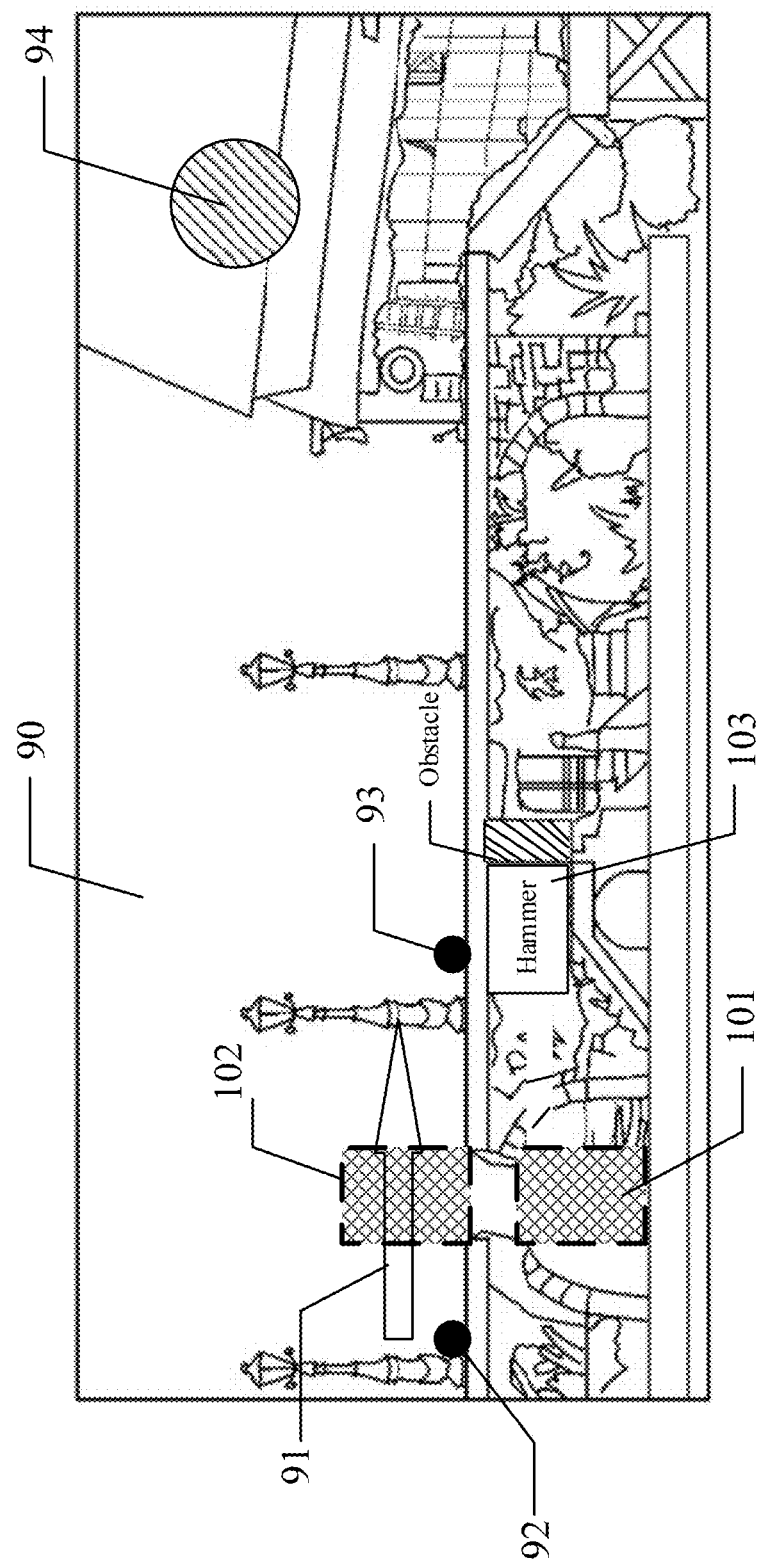
FIG. 10 is an exemplary schematic diagram of a display effect of another game picture.

In some embodiments, if the use control of the virtual prop is used to instructing the first virtual object to move to a target position, the multiple candidate path change solutions are path change solutions to different virtual props. For example, referring to FIG. 10, a game picture 90 includes a target movement path 91 that is in the unusable state, and the first virtual object is in a first position 92 and cannot move to a second position 93. In this case, after detecting a trigger operation on a use control 94 of a virtual prop, the client controls the first virtual object to use a first virtual prop (a block) or a second virtual prop (a hammer), and displays a first action position 101 and a second action position 102 of the first virtual prop, and an action position 103 of the second virtual prop in the game picture 90. The first action position 101 of the first virtual prop corresponds to a first candidate path change solution, the second action position 102 of the first virtual prop corresponds to a second candidate path change solution, and the action position 103 of the second virtual prop corresponds to a third candidate path change solution.

Figure 11:
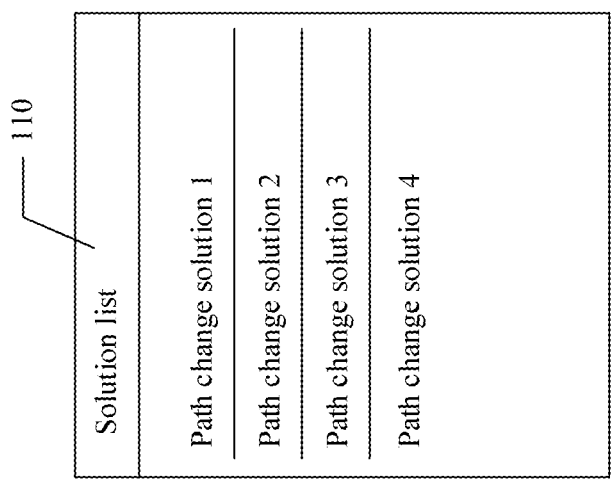
FIG. 11 is an exemplary schematic diagram of a display effect of a solution list.

In another possible implementation, indication information of the multiple candidate path change solutions is displayed in the game picture in a form of a list. For example, as shown in FIG. 11, after detecting the use operation on the virtual prop, the client displays a solution list 110 in the game picture, and the solution list 110 includes identification information of the candidate path change solutions. Further, after detecting a selection operation on identification information of a certain candidate path change solution, an action position of the virtual prop corresponding to the candidate path change solution is displayed in the game picture. The solution list 110 may include candidate path change solutions corresponding to the same or different virtual props. Certainly, in actual application, the indication information of the multiple candidate path change solutions may also be displayed in the game picture in a form of a card matrix. This is not limited in the embodiments of this application.

In this embodiment of this application, after displaying the multiple candidate path change solutions, the client detects the game picture, and if the selection operation on the target path change solution of the multiple candidate path change solutions is detected, the client adjusts the use state of the target movement path included in the game picture based on the target path change solution, and then obtains the adjusted target movement path.

In addition, types of virtual props involved in this application are briefly illustrated:

(1) Parachute: When a first virtual object character is floating in the air and has a sufficient height from the ground, the use control of the virtual prop is used to open the parachute to slow down a falling speed of the first virtual object. The user can flexibly adjust the falling speed of the first virtual object in the air through an operation on the use control of the virtual prop, and control the first virtual object to glide in the air by moving an operation control when the first virtual object is in the air.

(2) Sledgehammer: which assists the first virtual object to open a physical gear or destroy a specific gate, object, ground, obstacle and the like. After detecting a use operation on the sledgehammer, the client needs to obtain a physical material of an action position of the sledgehammer. If the physical material matches the sledgehammer, it is determined that the sledgehammer can destroy the position; and if the physical material does not match the sledgehammer, it is determined that the sledgehammer cannot destroy the position. Certainly, the sledgehammer may also reduce health points of an adversarial virtual object.

(3) Lava Core: After using the Lava Core, the first virtual object can walk in lava without being damaged, that is, the first virtual object obtains passive damage reduction for the lava. Moreover, after using the lava core, the first virtual object may also summon a reduction area for the adversarial virtual object.

(4) Energy Cube: After using the Energy Cube, the first virtual object can generate one or more energy cubes within an action range of the energy cube, and the energy cube disappears automatically after being generated for a period of time. After being generated, the energy cube can illuminate a certain range of area, and the first virtual object may stand above the energy cube.

(5) Almighty Gloves: After using the almighty gloves, the first virtual object can pick up or put down a virtual item with a damage effect (such as a seed covered with spikes and a burning bomb). Moreover, after a duration after the first virtual object picks up the virtual item reaches a certain value, the first virtual object can possess the virtual item, or the virtual item disappears in the virtual environment.

(6) Drone: after using the Drone, the first virtual object summons a drone that can move on the ground or in the air. The first virtual object may control the drone to move in the virtual environment to open a specific gear or observe the position of the adversarial virtual object.

The foregoing descriptions of the virtual props are only exemplary and explanatory, and in actual application, staff may flexibly configure a specific use function for each virtual prop, and the staff may also add a new virtual prop to the side-scrolling game. This is not limited in the embodiments of this application.

Figure 12:
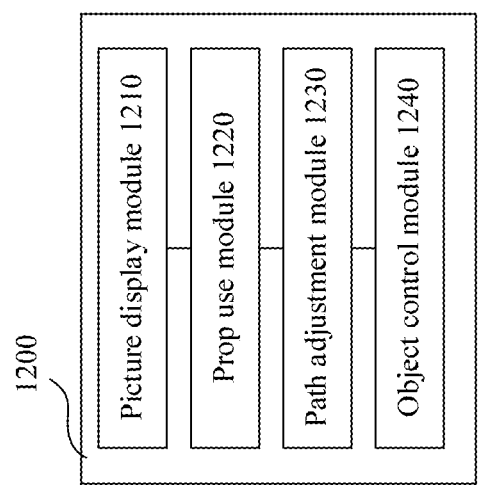
FIG. 12 is a block diagram of a virtual object control apparatus according to an embodiment of this application.

FIG. 12 is a block diagram of a virtual object control apparatus according to an embodiment of this application. The apparatus has a function of implementing the foregoing virtual object control method, and the function may be implemented by hardware or by hardware executing corresponding software. The apparatus may be a terminal or may be disposed in a terminal. The apparatus 1200 may include: a picture display module 1210, a prop use module 1220, a path adjustment module 1230, and an object control module 1240.

The picture display module 1210 is configured to display a game picture of a side-scrolling game, the game picture including a first virtual object and at least one movement path for the first virtual object to move.

The prop use module 1220 is configured to control, in response to a use operation on a virtual prop, the first virtual object to use the virtual prop, the virtual prop being used for changing a use state of the movement path.

The path adjustment module 1230 is configured to adjust a use state of a target movement path of the one or more movement paths included in the game picture according to the virtual prop to obtain the adjusted target movement path.

The object control module 1240 is configured to control the first virtual object to move on the adjusted target movement path.

In an exemplary embodiment, the target adjustment module 1230 is configured to switch the target movement path from an unusable state to a usable state in case that the virtual prop has first attribute information, to obtain the adjusted target movement path, where when the target movement path is in the unusable state, the first virtual object is unmovable on the target movement path; and when the target movement path is in the usable state, the first virtual object is movable on the target movement path.

In an exemplary embodiment, the path adjustment module 1230 is further configured to, eliminate an obstacle that is used for disconnecting the target movement path in the target movement path when the first attribute information is to eliminate an obstacle; or, add a usable movement path in the target movement path when the first attribute information is to add a path; or, replace an unusable movement path with a usable movement path in the target movement path when the first attribute information is to replace a path.

In an exemplary embodiment, the path adjustment module 1230 is configured to switch the target movement path from a usable state to an unusable state when the virtual prop has second attribute information, to obtain the adjusted target movement path, where when the target movement path is in the usable state, a second virtual object in the game picture is movable on the target movement path; and when the target movement path is in the usable state, the second virtual object in the game picture is unmovable on the target movement path, and the second virtual object has an adversarial relationship with the first virtual object.

In an exemplary embodiment, the path adjustment module 1230 is further configured to, add an obstacle that is used for disconnecting the target movement path in the target movement path when the second attribute information is to add an obstacle; or, replace a usable movement path with an unusable movement path in the target movement path when the second attribute information is to replace a path; or, eliminate the usable movement path in the target movement path when the second attribute information is to eliminate a path.

Figure 13:
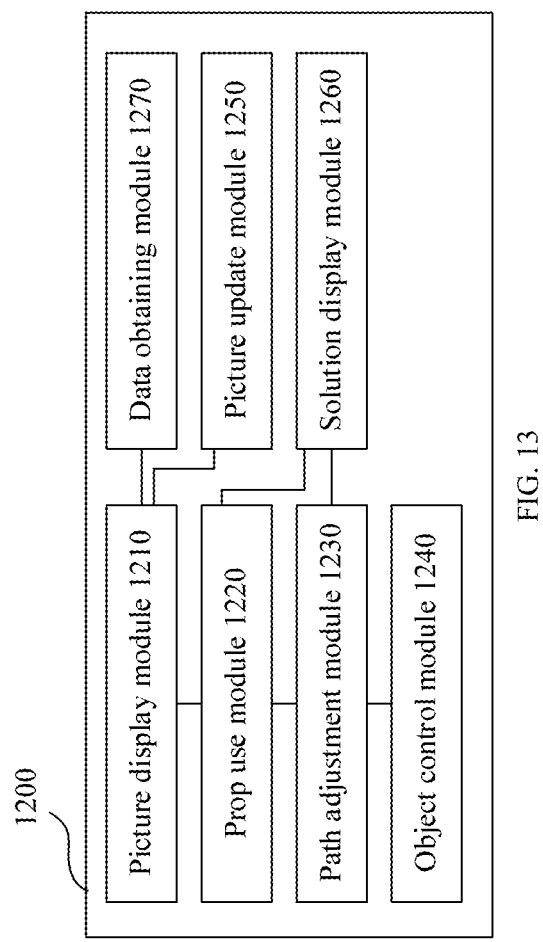
FIG. 13 is a block diagram of a virtual object control apparatus according to another embodiment of this application.

In an exemplary embodiment, as shown in FIG. 13, the apparatus 1200 further includes a picture update module 1250.

The picture update module 1250 is configured to update a virtual environment element corresponding to a target movement path based on the adjusted target movement path in a virtual environment displayed in the game picture.

In an exemplary embodiment, the picture update module 1250 is configured to, display the virtual prop as an obstacle in the virtual environment displayed in the game picture based on the adjusted target movement path; or, cancel display of the obstacle that is used for disconnecting the target movement path in the virtual environment displayed in the game picture based on the adjusted target movement path; or, display an action effect of the virtual prop on the target movement path in the virtual environment displayed in the game picture based on the adjusted target movement path.

In an exemplary embodiment, as shown in FIG. 13, the apparatus 1200 further includes a solution display module 1260.

The solution display module 1260 is configured to, generate multiple candidate path change solutions based on attribute information of the virtual prop, where the different path change solutions correspond to different path adjustment manners; and display the multiple candidate path change solutions.

The path adjustment module 1230 is further configured to adjust, in response to a selection operation on a target path change solution of the multiple candidate path change solutions, the use state of the target movement path included in the game picture based on the target path change solution to obtain the adjusted target movement path.

In an exemplary embodiment, the solution display module 1260 is configured to display an action position of the virtual prop in the game picture based on the multiple candidate path change solutions, where the different path change solutions correspond to different display styles of the action position of the virtual prop.

In an exemplary embodiment, as shown in FIG. 13, the apparatus 1200 further includes a data obtaining module 1270.

The data obtaining module 1270 is configured to obtain attribute data of the first virtual object.

The picture display module 1210 is further configured to display a use control of the virtual prop in the game picture when the attribute data of the first virtual prop meets a condition, where the use control is used for triggering the use operation on the virtual prop.

In conclusion, in the technical solutions provided in the embodiments of this application, the state of the target movement path included in the game picture is adjusted through the virtual prop, so that the target movement path is adjustable, which increases diversity of the game and enriches game content. The user can adjust the target movement path according to an actual situation, which makes the game operation more flexible.

Figure 14:
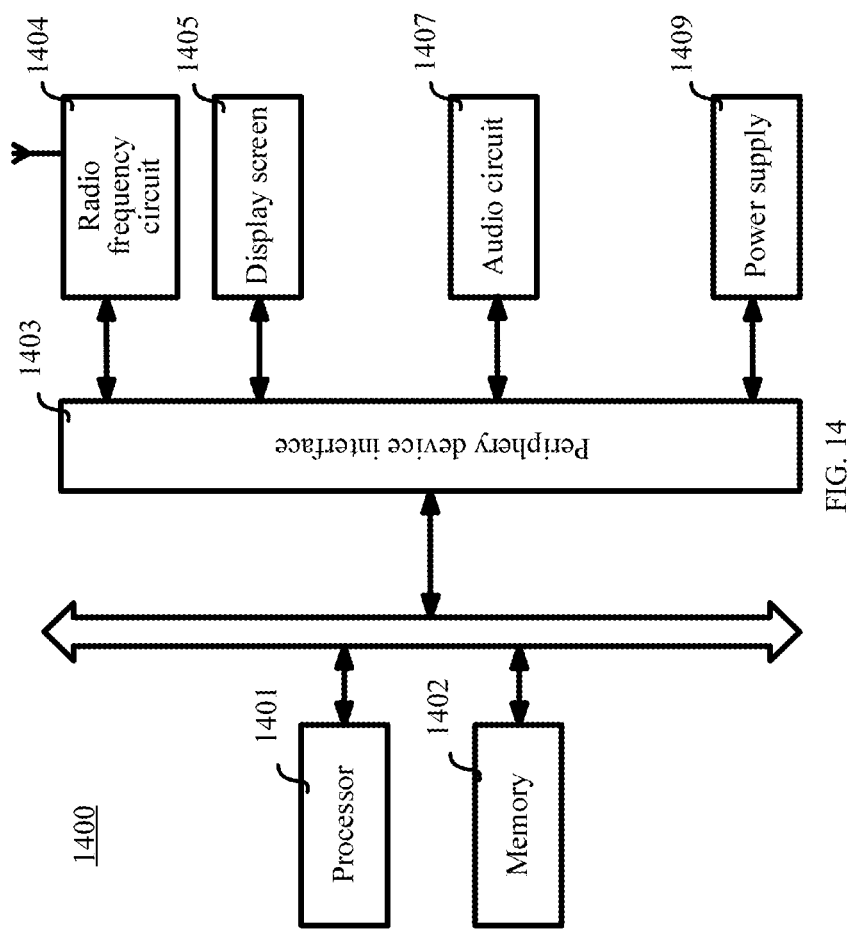
FIG. 14 is a structural block diagram of a terminal according to an embodiment of this application.

FIG. 14 is a structural block diagram of a terminal 1400 according to an embodiment of this application. The terminal 1400 may be an electronic device such as a mobile phone, a tablet computer, a game console, an ebook reader, a multimedia player, a wearable device, or a PC. The terminal is configured to implement the virtual object control method provided in the foregoing embodiments. The terminal may be the terminal 10 in the game running environment shown in FIG. 1. To be specific, generally, the terminal 1400 includes: a processor 1401 and a memory 1402.

The processor 1401 may include one or more processing cores, for example, a 4-core processor, and an 8-core processor. The processor 1401 may be implemented by using at least one hardware form of a digital signal processor (DSP), a field programmable gate array (FPGA), and a programmable logic array (PLA). The processor 1401 may alternatively include a main processor and a coprocessor. The main processor is a processor configured to process data in an awake state, and is also referred to as a central processing unit (CPU). The coprocessor is a low power consumption processor configured to process the data in a standby state. In some embodiments, the processor 1401 may be integrated with a graphics processing unit (GPU). The GPU is configured to be responsible for rendering and drawing content that a display screen needs to display. In some embodiments, the processor 1401 may further include an AI (Artificial Intelligence) processor. The AI processor is configured to process a computing operation related to machine learning.

The memory 1402 may include one or more computer-readable storage media that may be non-transient. The memory 1402 may further include a high-speed random access memory and a non-volatile memory, for example, one or more disk storage devices or flash storage devices. In some embodiments, the non-transient computer-readable storage medium in the memory 1402 is configured to store at least one instruction, at least one program, a code set, or an instruction set, the at least one instruction, the at least one program, the code set, or the instruction set being configured to be executed by one or more processors to implement the foregoing virtual object control method.

In some embodiments, the terminal 1400 includes: a peripheral device interface 1403 and at least one peripheral device. The processor 1401, the memory 1402, and the peripheral device interface 1403 may be connected through a bus or a signal cable. Each peripheral device may be connected to the peripheral device interface 1403 through the bus, the signal cable, or a circuit board. Specifically, the peripheral device includes: at least one of a radio frequency circuit 1404, a display screen 1405, an audio circuit 1407, and a power supply 1409.

A person skilled in the art may understand that the structure shown in FIG. 14 constitutes no limitation on the terminal 1400, and the terminal may include more or fewer components than those shown in the figure, or some components may be combined, or a different component deployment may be used.

In an exemplary embodiment, a computer-readable storage medium is further provided, storing at least one instruction, at least one program, a code set, or an instruction set, the at least one instruction, the at least one program, the code set, or the instruction set, when executed by the processor, implements the foregoing virtual object control method.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM).

In an exemplary embodiment, a computer program product or a computer program is further provided. The computer program product or the computer program includes computer instructions, and the computer instructions are stored in a computer-readable storage medium. A processor of a terminal reads the computer instructions from the computer-readable storage medium, and executes the computer instructions, to cause the terminal to perform the foregoing virtual object control method.

It is to be understood that the "multiple" mentioned in this specification means two or more. In addition, the step numbers described in this specification merely schematically show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this application.

The foregoing descriptions are merely exemplary embodiments of this application, but are not intended to limit this application. Any modification, equivalent replacement, or improvement made within the spirit and principle of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A virtual object control method, performed by a terminal, the method comprising:
    displaying a game picture of a side-scrolling game, the game picture comprising a first virtual object and one or more movement paths for a user of the terminal to control the first virtual object to move in the side-scrolling game;
    in response to a use operation on a virtual prop, controlling the first virtual object to use the virtual prop for changing a use state of a movement path for the first virtual object to move in the side-scrolling game;
    generating multiple candidate path change solutions from the one or more movement paths based on attribute information of the virtual prop, wherein different path change solutions correspond to different path adjustment manners;
    displaying the multiple candidate path change solutions;

in response to a user selection operation on a target path change solution of the multiple candidate path change solutions, adjusting a use state of a target movement path of the one or more movement paths comprised in the game picture from an unusable state to a usable state according to the virtual prop having first attribute information to obtain the adjusted target movement path; and displaying movement of the first virtual object on the adjusted target movement path in response to a user trigger operations.

2. The method according to claim 1, wherein the method further comprises:

updating a virtual environment element corresponding to the target movement path in a virtual environment displayed in the game picture based on the adjusted target movement path.

3. The method according to claim 1, wherein the displaying the multiple candidate path change solutions comprises:

displaying an action position of the virtual prop in the game picture based on the multiple candidate path change solutions, wherein the different path change solutions correspond to different display styles of the action position of the virtual prop.

4. The method according to claim 1, further comprising:

obtaining attribute data of the first virtual object; and displaying a use control of the virtual prop in the game picture when the attribute data of the first virtual prop meets a condition, wherein the use control is used for triggering the use operation on the virtual prop.

5. A terminal, comprising a processor and a memory, the memory storing at least one instruction, the at least one instruction being loaded and executed by the processor and causing the terminal to implement a virtual object control method including:

displaying a game picture of a side-scrolling game, the game picture comprising a first virtual object and one or more movement paths for a user of the terminal to control the first virtual object to move in the side-scrolling game;

in response to a use operation on a virtual prop, controlling the first virtual object to use the virtual prop for changing a use state of a movement path for the first virtual object to move in the side-scrolling game;

generating multiple candidate path change solutions from the one or more movement paths based on attribute information of the virtual prop, wherein different path change solutions correspond to different path adjustment manners;

displaying the multiple candidate path change solutions;

in response to a user selection operation on a target path change solution of the multiple candidate path change solutions, adjusting a use state of a target movement path of the one or more movement paths comprised in the game picture from an unusable state to a usable state according to the virtual prop having first attribute information to obtain the adjusted target movement path; and displaying movement of the first virtual object on the adjusted target movement path in response to a user trigger operations.

6. The terminal according to claim 5, wherein the method further comprises:

updating a virtual environment element corresponding to the target movement path in a virtual environment displayed in the game picture based on the adjusted target movement path.

7. The terminal according to claim 5, wherein the displaying the multiple candidate path change solutions comprises:

displaying an action position of the virtual prop in the game picture based on the multiple candidate path change solutions, wherein the different path change solutions correspond to different display styles of the action position of the virtual prop.

8. The terminal according to claim 5, wherein the method further comprises:

obtaining attribute data of the first virtual object; and displaying a use control of the virtual prop in the game picture when the attribute data of the first virtual prop meets a condition, wherein the use control is used for triggering the use operation on the virtual prop.

9. A non-transitory computer-readable storage medium, storing at least one instruction, the at least one instruction being loaded and executed by a processor of a terminal and causing the terminal to implement a virtual object control method including:

displaying a game picture of a side-scrolling game, the game picture comprising a first virtual object and one or more movement paths for a user of the terminal to control the first virtual object to move in the side-scrolling game;

in response to a use operation on a virtual prop, controlling the first virtual object to use the virtual prop for changing a use state of a movement path for the first virtual object to move in the side-scrolling game;

generating multiple candidate path change solutions from the one or more movement paths based on attribute information of the virtual prop, wherein different path change solutions correspond to different path adjustment manners;

displaying the multiple candidate path change solutions;

in response to a user selection operation on a target path change solution of the multiple candidate path change solutions, adjusting a use state of a target movement path of the one or more movement paths comprised in the game picture from an unusable state to a usable state according to the virtual prop having first attribute information to obtain the adjusted target movement path; and displaying movement of the first virtual object on the adjusted target movement path in response to a user trigger operations.

10. The non-transitory computer-readable storage medium according to claim 9, wherein the method further comprises:

updating a virtual environment element corresponding to the target movement path in a virtual environment displayed in the game picture based on the adjusted target movement path.

11. The non-transitory computer-readable storage medium according to claim 9, wherein the method further comprises:

obtaining attribute data of the first virtual object; and displaying a use control of the virtual prop in the game picture when the attribute data of the first virtual prop meets a condition, wherein the use control is used for triggering the use operation on the virtual prop.

* * * * *